E. TAYLOR.
Cattle-Pump.
No. 207,458.  Patented Aug. 27, 1878.
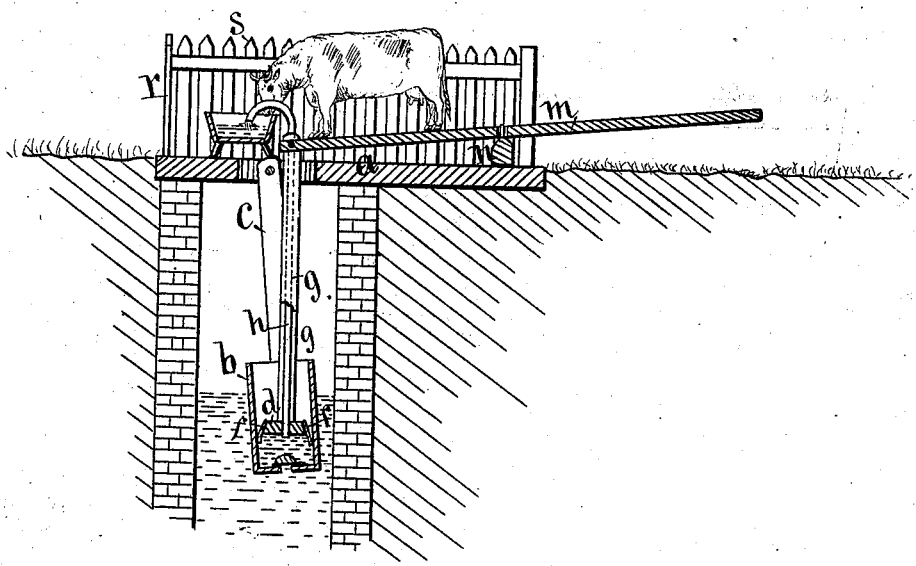
Witnesses:
Frank W. Heers
R. G. Orwig
Inventor:
Edward Taylor,
By Thomas G. Orwig,
Attorney.

UNITED STATES PATENT OFFICE.

EDWARD TAYLOR, OF NEW PROVIDENCE, IOWA.

IMPROVEMENT IN CATTLE-PUMPS.

Specification forming part of Letters Patent No. 207,458, dated August 27, 1878; application filed February 14, 1878.

*To all whom it may concern:*

Be it known that I, EDWARD TAYLOR, of New Providence, in the county of Hardin and State of Iowa, have invented an Improved Cattle-Pump, of which the following is a specification:

My invention relates to that class of pumps in which an oscillating platform is connected with a piston in such a manner that the weight of an animal on the platform will operate the piston in a cylinder, and thereby elevate water into a trough that is accessible to the animal while on the platform.

My object is to simplify the construction of the operative mechanism, and to increase its effectiveness and durability.

It consists in a cone-shaped vibrating piston, a vibrating cylinder, a vibrating well-tube, and an oscillating platform, being flexibly connected and arranged, and combined in such a manner that when an animal approaches the trough to drink, its weight will press the piston down, and thereby force the contents of the cylinder up through the well-tube into the trough, and when the animal leaves the platform it elevates the piston and lowers the platform to receive a second animal, so that an entire herd can consecutively operate the pump and obtain water without assistance, as hereinafter fully set forth.

My drawing is a sectional central elevation illustrating the construction, application, and operation of my complete invention.

$a$ represents a base, to which all the operative mechanism is attached. It is a rigid frame and floor, resting solidly upon the wall of the well, so as to partly inclose the mouth of the well. $b$ is a cylinder of common form, rigidly attached to rigid bearers $c$, that are pivoted at their top ends to the base $a$ in such a way as to allow the suspended cylinder to vibrate in the well.

A suspended cylinder and a horizontal platform have been jointly hinged together by means of one fulcrum fixed at a distance from the well; but my manner of suspending a vibrating cylinder from a fixed platform, at a point that is central relative to the well, and combining it with an oscillating platform that has its fulcrum at a distance from the well by a piston suspended from the same platform, is a valuable improvement, by means of which I increase the stroke of the piston, and consequently elevate more water each time it is operated by an animal advancing over the platform to the trough.

$d$ is a piston-head of conical form and of less diameter than the cylinder $b$, in which it operates. It has a flexible packing-band, $f\,f$, (preferably leather,) around its beveled circumference, which band extends below the piston-head, and flares outwardly sufficiently to fill the cylinder, and to prevent the water from rising therein above the piston when descending, and to produce a suction when the piston rises in the cylinder.

I am aware that pump-buckets have been made of flexible material and of flaring form in such a manner as to fill a well-tube, and to facilitate the lifting of water. By my manner of forming a cone-shaped piston-head of diminished size, and combining a flaring flexible band therewith, I am enabled to use a rigid piston-rod and a rigid well-tube, in combination with an oscillating platform and a vibrating cylinder, without causing any strain or binding of the piston in the cylinder, as it is alternately pressed down and raised up by the weight of an animal to perform the functions of a suction and force pump.

$g\,g$ are parallel bars rigidly fixed to the piston-head $d$, and pivoted at their top ends to the front end and center of the oscillating platform. $h$ is a well-tube rigidly attached to the piston in such a manner that water can rise through the piston and pass upward through the tube to be discharged into a stationary trough that is accessible to the animals. $m$ is an oscillating platform, mounted upon a fulcrum, $n$, that is connected with the base $a$, or fixed stationary in its proper position relative to the well and the platform in any suitable way. This platform $m$ may be constructed of a frame and flooring in any manner that will produce a rigid, strong, and durable support for the animals. It extends forward from its fulcrum, so that its front end partly covers the well, and rearward sufficiently far to rest upon the ground when an animal is passing on and off, and to stand sufficiently elevated when an animal is drinking to prevent other animals from attempting to get upon the rear end of the platform.

r s represent a fence or cattle-guard inclosing the trough and well and the front portion of the oscillating platform, in such a manner that the trough cannot be reached by an animal unless it passes over the platform.

In the practical operation of my improved pumping mechanism, when the cylinder is submerged in the well, the pressing down of the rear end of the platform will cause the piston to rise, and to produce a suction that will fill the cylinder. An animal can then readily step upon the rear end of the platform and pass forward to the trough, and in so doing will press down the front end of the platform and the piston that is flexibly connected therewith. The descent of the piston in the cylinder will force the water up through the tube carried by the piston, and discharge it into the trough, from whence the animal can drink it; and when the animal backs from the platform its weight on the rear end causes a reverse motion to all the flexibly-connected moving parts, and readjusts them, as required, to allow another animal to operate the pump and get a drink.

I am aware that a well-tube has been carried by a swinging and reciprocating piston that was suspended from an oscillating platform to operate in a stationary cylinder; but my manner of suspending a cylinder, so as to allow it to vibrate and accommodate itself to the changing positions of the oscillating platform and the vibrating piston, produces a flexible connection of all the operative parts, that is novel and greatly advantageous.

I claim as my invention—

1. The cone-shaped piston-head $d$, having a flexible packing-band, $f\ f$, flaring outward and extending below the piston-head, in combination with the swinging cylinder $b$, substantially as and for the purposes shown and described.

2. The combination of the base $a$, the suspended vibrating cylinder $b\ c$, the suspended vibrating piston $d\ f\ f$, carrying the well-tube $h$, and the oscillating platform $m$, mounted upon the fulcrum $n$, fixed outside of the well, substantially as shown and described, to operate in the manner and for the purposes specified.

EDWARD TAYLOR.

Witnesses:
FRANK W. HEERS,
R. G. ORWIG.